United States Patent
Parodi et al.

(10) Patent No.: US 6,515,085 B1
(45) Date of Patent: Feb. 4, 2003

(54) COMPONENTS AND CATALYSTS FOR THE POLYMERIZATION OF OLEFINS

(75) Inventors: Sandro Parodi, Novara (IT); Roberto Nocci, Novara (IT); Umberto Giannini, Milan (IT); Pier Camillo Barbe', Ferrara (IT); Umberto Scata', Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 08/371,048

(22) Filed: Jan. 10, 1995

Related U.S. Application Data

(63) Continuation of application No. 08/217,002, filed on Mar. 23, 1994, now abandoned, which is a continuation of application No. 08/073,245, filed on Jun. 4, 1993, now abandoned, which is a continuation of application No. 07/759,776, filed on Sep. 13, 1991, now abandoned, which is a continuation of application No. 07/629,021, filed on Dec. 18, 1990, now abandoned, which is a continuation of application No. 07/518,237, filed on May 7, 1990, now abandoned, which is a continuation of application No. 07/244,594, filed on Sep. 13, 1988, now abandoned, which is a continuation of application No. 07/027,055, filed on Mar. 23, 1987, now abandoned, which is a continuation of application No. 06/873,522, filed on Jun. 12, 1986, now abandoned, which is a continuation of application No. 06/787,043, filed on Oct. 15, 1985, now abandoned, which is a continuation of application No. 06/555,400, filed on Nov. 28, 1983, now abandoned, which is a continuation of application No. 06/292,157, filed on Aug. 12, 1981, now abandoned.

(30) Foreign Application Priority Data

Aug. 13, 1980 (IT) .......................................... 24141 A/80

(51) Int. Cl.$^7$ ................................................. C08F 4/649
(52) U.S. Cl. ................................. 526/125.3; 526/124.9; 502/124; 502/125; 502/126; 502/127; 502/134
(58) Field of Search ................................. 502/125, 127, 502/124, 126, 134; 526/124.9, 125.3

(56) References Cited

U.S. PATENT DOCUMENTS

| | | | |
|---|---|---|---|
| 3,362,916 A | 1/1968 | Price et al. | |
| 3,642,746 A | 2/1972 | Kashiwa et al. | |
| 3,701,763 A | 10/1972 | Wada et al. | |
| 4,069,169 A | 1/1978 | Toyoda et al. | |
| 4,071,672 A * | 1/1978 | Kashiwa | 526/125 |
| 4,083,802 A * | 4/1978 | Matsuura et al. | 526/125 |
| 4,085,276 A * | 4/1978 | Toyota et al. | 526/125 |
| 4,115,319 A * | 9/1978 | Scata et al. | 526/125 |
| 4,143,223 A | 3/1979 | Toyota et al. | |
| 4,149,990 A | 4/1979 | Giannini et al. | |
| 4,157,435 A | 6/1979 | Toyota et al. | |
| 4,180,636 A * | 12/1979 | Hirota et al. | 526/125 |
| 4,187,196 A * | 2/1980 | Giannini et al. | 526/125 |
| 4,218,339 A * | 8/1980 | Zucchini et al. | 526/125 |
| 4,220,745 A * | 9/1980 | Tanaka et al. | 526/125 |
| 4,277,589 A * | 7/1981 | Giannini et al. | 526/125 |
| 4,290,915 A | 9/1981 | Toyota et al. | |
| 4,301,029 A | 11/1981 | Caunt et al. | |
| 4,302,566 A | 11/1981 | Karol et al. | |
| 4,321,345 A * | 3/1982 | Sato et al. | 526/125 |
| 4,328,122 A | 5/1982 | Monte et al. | |
| 4,329,253 A | 5/1982 | Goodall et al. | |
| 4,330,649 A * | 5/1982 | Kioka et al. | 526/125 |
| 4,331,558 A | 5/1982 | Welch et al. | |
| 4,331,561 A * | 5/1982 | Luciani et al. | 526/125 |
| 4,336,360 A * | 6/1982 | Giannini et al. | 526/125 |
| 4,348,507 A | 9/1982 | Ueno et al. | |
| 4,369,306 A | 1/1983 | Toyota et al. | |
| 4,390,671 A | 6/1983 | Imai et al. | |
| 4,393,182 A | 7/1983 | Goodall et al. | |
| 4,399,054 A | 8/1983 | Ferraris et al. | |
| 4,544,717 A | 10/1985 | Mayr et al. | |
| 4,581,426 A * | 4/1986 | Asanuma et al. | 526/128 |

FOREIGN PATENT DOCUMENTS

| | | |
|---|---|---|
| BE | 868682 | 1/1979 |
| CH | 421526 | 3/1967 |
| DE | 13 01 071 | 8/1969 |
| DE | 19 39 074 | 2/1970 |
| DE | 20 29 992 | 12/1970 |
| DE | 24 26 795 | 1/1975 |
| DE | 24 61 677 | 7/1975 |
| DE | 26 12 650 | 10/1976 |
| DE | 26 43 143 | 6/1977 |
| DE | 26 40 679 | 3/1978 |
| DE | 27 42 585 | 3/1978 |
| DE | 27 42 586 | 3/1978 |
| DE | 27 43 366 | 3/1978 |
| DE | 30 02 879 | 8/1980 |

(List continued on next page.)

OTHER PUBLICATIONS

Kirk–Othmer, Encyclopedia of Chemical Technology, 3rd Ed, vol. 20, John Wiley & SOns, N.Y, (1982) p. 912.*
Fert., Soils, Plant Nutr., 85:76682z.

*Primary Examiner*—Fred Teskin

(57) ABSTRACT

Catalyst-forming components and catalysts for the polymerization of olefins based on said components are disclosed. The catalysts comprise the reaction product of:

(a) an Al alkyl compound;
(b) a silicon compound containing at least a Si—OR or Si—OCOR or Si—NR$_2$ bond, R being a hydrocarbyl radical; and
(c) a solid comprising, as essential support, a Mg dihalide in active form and, supported thereon, a Ti halide or a halo-Ti-alcoholate or said halogenated Ti compound and a silicon compound as defined in (b) in a molar ratio with the supported Ti compound from 1.0 mole to 5 moles of silicon compound per mole of Ti compound. The present invention refers to new supported components of catalysts for the polymerization of CH$_2$=CHR olefins wherein R is an alkyl radical with 1 to 4 carbon atoms, or an aryl radical, and mixtures of said olefins with ethylene, and to the catalysts obtained from said components.

4 Claims, No Drawings

FOREIGN PATENT DOCUMENTS

| | | | |
|---|---|---|---|
| EP | 0 013 387 A1 | | 7/1980 |
| EP | 0 045 975 B1 | | 2/1982 |
| EP | 0 045 976 A2 | | 2/1982 |
| EP | 0 045 977 B1 | | 2/1982 |
| EP | 0 086 473 A2 | | 8/1983 |
| EP | 0 115 195 A1 | | 8/1984 |
| FI | 59107 | | 7/1975 |
| FI | 62672 | | 10/1982 |
| GB | 1128090 | | 9/1968 |
| GB | 1310547 | | 3/1973 |
| GB | 1387890 | | 3/1975 |
| GB | 1452314 | | 10/1976 |
| GB | 1539900 | | 2/1979 |
| GB | 1559194 | | 1/1980 |
| GB | 2040967 | * | 9/1980 |
| GB | 2 040 967 A | | 9/1980 |
| GB | 2 052 534 A | | 1/1981 |
| JP | 66-019993 | | 11/1966 |
| JP | 49-133488 | | 12/1974 |
| JP | 75-103495 | | 8/1975 |
| JP | 51-55385 | * | 5/1976 |
| JP | 51-55386 | | 5/1976 |
| JP | 76-55386 | | 5/1976 |
| JP | 52-151691 | | 2/1977 |
| JP | 77-151691 | | 12/1977 |
| JP | 79-39484 | | 3/1979 |
| JP | 79-94590 | | 7/1979 |
| JP | 53-000037 | | 7/1979 |
| JP | 5513709 | * | 1/1980 |
| JP | 80-36203 | | 3/1980 |
| JP | 53-108057 | | 3/1980 |
| JP | 55-123604 | * | 9/1980 |
| JP | 55-145706 | * | 11/1980 |
| JP | 56-26902 | | 3/1981 |
| PL | 086621 | | 7/1976 |
| PL | 099033 | | 3/1978 |
| PL | 106505 | | 9/1980 |
| PL | 118176 | | 4/1983 |
| SE | 225961 | | 4/1969 |
| SU | 403193 | | 3/1981 |
| SU | 812185 | | 3/1981 |
| SU | 858571 | | 8/1981 |

* cited by examiner

COMPONENTS AND CATALYSTS FOR THE POLYMERIZATION OF OLEFINS

This application is a continuation of application Ser. No. 08/217,002, filed Mar. 23, 1994 now abandoned, which is a continuation of application Ser. No. 08/073,245, filed Jun. 4, 1993, now abandoned, which is a continuation of application Ser. No. 07/759,776, filed Sep. 13, 1991, now abandoned, which is a continuation of application Ser. No. 07/629,021, filed Dec. 18, 1990, now abandoned, which in turn is a continuation of application Ser. No. 07/518,237, filed May. 7, 1990, now abandoned, which in turn is a continuation of application Ser. No. 07/244,594, filed Sep. 13, 1988, now abandoned, which in turn in turn is a continuation of application Ser. No. 07/027,055, filed Mar. 23, 1987, now abandoned, which is a continuation of application Ser. No. 06/873,522, filed Jun. 12, 1986, now abandoned, which in turn is a continuation of application Ser. No. 06/787,043, filed Oct. 15, 1985, now abandoned, which in turn is a continuation of application Ser. No. 06/555,400, filed Nov. 28, 1983, now abandoned, which in turn is a continuation of application Ser. No. 06/292,157, filed Aug. 12, 1981, now abandoned.

BACKGROUND OF THE INVENTION

The supported highly active and highly stereospecific catalysts for the polymerization of propylene and higher olefins known up to now are obtained by the reaction of an Al alkyl compound partially complexed with an electron-donor compound (outside donor) with a solid component comprising a Ti compound and an electron-donor compound (inside donor) supported on a Mg dihalide in active form.

Examples of such catalysts have been described in British Patent No. 1,559,194 and Belgian Patent No. 868,682.

Those supported catalysts require the use of an inside donor in order to obtain polymers having a high isotactic index. If the inside donor is omitted, polymers having a low isotactic index are obtained.

THE PRESENT INVENTION

One object of this invention is to provide catalyst components which comprise a silicon compound as defined herein-above and which yield catalysts that polymerize the alpha-olefins to high yields of polymers having a high isotacticity index.

This and other objects are achieved by the present invention in accordance with which it has been found, unexpectedly, that it is possible to obtain, with high yield, polymers of alpha-olefins having a high isotactic index by using Ti-containing Mg dihalides-supported catalysts free from inside electron-donor compounds, if an outside donor is used which is a silicon compound containing Si—OR, Si—OCOR or Si—NR$_2$ bonds.

It has also been found, even more unexpectedly, that the activity and stereospecificity of the catalysts can be further increased if the silicon compound used as outside donor is present as inside donor also in the Ti-containing Mg dihalide-supported component in amounts corresponding to molar ratios between the silicon compound and the supported halogenated Ti- compound comprised between 0.1 and 5.

The above results are surprising if one considers that catalysts are known which are prepared by using, as both inside and outside donor, a silicon compound containing Si—O—C bonds and the activity and stereospecificity of which are not increased over the activity and stereospecificity obtainable with catalysts in which an ester of benzoic acid is used as inside and outside donor.

The catalysts of this invention comprise the product of the reaction between the following components:

(a) an Al trialkyl or Al alkyl compound containing 2 or more aluminum atoms linked to each other through oxygen or nitrogen atoms or through SO$_4$ or SO$_3$ groups;

(b) a silicon compound containing one or more Si—OR, Si—OCOR or Si—NR$_2$ bonds (R being a hydrocarbyl radical); and (c) a solid comprising, as essential support, an anhydrous Mg dihalide in the active form as defined infra and, supported on said dihalide, a Ti halide or Ti haloalcoholate, or the solid (c) containing supported therein also a silicon compound as defined in (b) in an amount corresponding to a molar ratio between the supported silicon compound and the supported halogenated Ti compound comprised between 0.1 and 5.

The active anhydrous Mg dihalides forming the essential support of component (c) are the Mg dihalides showing in the X-rays powder spectrum of component (c) a broadening of at least 30% of the most intense diffraction line which appears in the powder spectrum of the corresponding dihalide having 1 m$^2$/g of surface area, or are the Mg dihalides showing an X-rays powder spectrum in which said most intense diffraction line is replaced by a halo with the intensity peak shifted with respect to the interplanar distance of the most intense line; and/or are the Mg dihalides having a surface area greater than 3 m$^2$/g.

The measurement of the surface area of the Mg dihalides is made on component (c) after treatment with boiling TiCl$_4$ for 2 hours. The found value is considered as surface area of the Mg dihalide.

Very active forms of Mg dihalides are those giving an X-rays powder spectrum in which the most intense diffraction line appearing in the spectrum of the corresponding halide having 1 m$^2$/g of surface area is decreased in relative intensity and broadened to form a halo, or are those in which said most intense line is replaced by a halo having its intensity peak shifted with respect to the interplanar distance of the most intense line. Generally, the surface area of the above forms is higher than 30–40 m$^2$/g and is comprised in particular between 100–300 m$^2$/g.

Active forms are also those deriving from the above forms by heat-treatment in inert hydrocarbon solvents and showing, in the X-rays spectrum, sharp diffraction lines in place of the halos.

The sharp, most intense line of these forms shows a broadening of at least 30% with respect to the corresponding line of the Mg dihalide having 1 m$^2$/g of surface area.

Preferred Mg dihalides are Mg dichloride and Mg dibromide. The content in water of the dihalides is generally less than 1% by weight.

By Ti halides or Ti haloalcoholates and esters supported on the active Mg dihalide is meant the above compound which may be chemically or physically fixed on the support, and not extractable from component (c) by treatment of the same with boiling 1,2-dichloroethane for 2 hours.

Components (a), (b) and (c) are made to react with each other in any order; preferably, however, components (a) and (b) are premixed before being contacted with component (c).

The pre-mixing of (a) and (b) is conducted at temperatures comprised, usually, between room temperature and the temperature used in the polymerization process.

The pre-reaction of (c) and (b) may be carried out also at higher temperatures. Also, compound (b) may be incorporated and made to react with component (c) itself. Component (b) is made to react in a molar ratio with respect to the halogenated Ti compound supported on component (c) of at least 1 and in a molar ratio with respect to the Al alkyl compound used as component (a) of less than 20 and preferably comprised between 0.05 and 0.3.

In component (c), the molar ratio between the Mg dihalide and the halogenated Ti compound supported therein is comprised between 1 and 500 and the molar ratio between said halogenated Ti compound and the electron-donor supported on the Mg dihalide is comprised between 0.1 and 50.

The silicon compounds set forth in (b) include compounds of general formula:

wherein:

R is an alkyl, alkenyl, aryl, arylalkyl or cycloalkyl radical with from 1 to 20 carbon atoms;

Y is an —OR', —OCOR', —NR'$_2$ group wherein R', either equal to or different from R, has the same meaning as R;

X is either a halogen or hydrogen atom or an —OCOR'' or —NR''$_2$ group wherein R'', either equal to or different from R', has the same meaning as R';

m, n and p are numbers comprised, respectively, between: 0 and 3 for m, 1 and 4 for n and 0 and 1 for p; and m+n+p is equal to 4.

Other silicon compounds that may be used are compound in which two or more silicon atoms are bound to each other through oxygen or nitrogen atoms.

Examples of these compounds are hexaethoxydisiloxane and symmetrical diphenyltetraethoxydisiloxane:

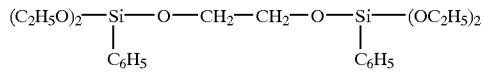

Preferred silicon compounds are: phenylalkoxysilanes such as phenyltriethoxy or trimethoxysilane, diphenyldimethoxy and diethoxysilane, monochlorophenyldiethoxysilane; alkylalkoxysilanes as, e.g., ethyltriethoxysilane and ethyltriisopropoxysilane.

Examples of other suitable compounds are: chlorotriethoxysilane, acetoxytriethoxysilane, vinyltriethoxysilane, butyltriethoxysilane, triphenylmonoethoxysilane, phenyltricycloethoxysilane, phenyldiethoxydiethylaminosilane, tetraphenoxysilane and tetralkoxysilanes such as tetramethoxysilane.

The silicon compound can be also formed in situ by reaction of, for instance, a halogenated silicon compound such as SiCl$_4$ with an alcohol or an alcoholate of Mg or Al.

In the catalysts of the invention the silicon compound is present in a combined form in the solid product of the reaction between the various catalyst-forming components, in a molar ratio between the silicon compound and the halogenated Ti compound greater than 0.05 and generally comprised between 0.1 and 5.

The Al alkyl compounds forming component (a) include Al trialkyls as, for instance, Al triethyl, Al triisobutyl, Al triisopropyl, and compounds containing two or more Al atoms linked to each other through hetero-atoms as:

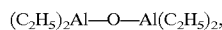

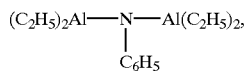

and

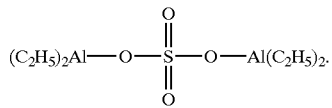

As indicated, Al alkyl compounds in which Al atoms are linked through groups such as SO$_4$ or SO$_3$ are also suitable.

The Al alkyl compounds may be used in mixture with Al alkyl halides, e.g., AlEt$_2$Cl.

Component (c) is prepared according to various methods, one of which, and also one of the preferred methods, consists in co-milling the Mg dihalide, the Ti halide or Ti haloalcoholate and the silicon compound when it is used, until appearance in the X-rays spectrum of the milled product of the modifications above set forth for the spectrum of the Mg dihalide and in heat-treating the milled product in suspension in a halogenated hydrocarbon as, e.g., 1,2 dichloroethane, separating the solid product and washing it with heptane or a similar hydrocarbon solvent. The duration of the treatment is generally comprised between 1 and 4 hours and depends on the temperature of treatment.

According to another method, an adduct between a Mg dihalide and an alcohol is reacted with TiCl$_4$. The reactions are described in Belgian patent 868,682 and published German patent No. 3,022,738.

In all the above methods, the final product contains a Mg dihalide, present in the active form as set forth supra.

Other known methods which lead to the formation of Mg dihalide in active form or to Ti-containing Mg dihalide supported components, in which the dihalide is present in active form, are based on the following reactions:

reaction of a Grignard reagent or a MgR$_2$ compound (R being a hydrocarbyl radical) or complexes of said MgR$_2$ compounds with Al trialkyls, with halogenating agents as AlX$_3$ or AlR$_m$X$_n$ compounds (X is halogen, R is a hydrocarbyl, m+n=3 SiCl$_4$ or HSiCl$_3$;

reaction of a Grignard reagent with a silanol or polysiloxane, H$_2$O or with an alcohol and further reaction with a halogenating agent, or with TiCl$_4$;

reaction of Mg with an alcohol and a halogenhydric acid, or of Mg with a hydrocarbyl halide and an alcohol;

reaction of MgO with Cl$_2$ or AlCl$_3$;

reaction of MgX$_2$.nH$_2$O (X=halogen) with a halogenating agent or TiCl$_4$;

reaction of Mg mono or dialcoholates or Mg carboxylates with a halogenating agent.

The Ti halides or Ti halogenalcoholates include, in particular, the Ti tetrahalides, Ti trihalides and Ti trihalogenalcoholates. Preferred compounds are: TiCl$_4$, TiBr$_4$, 2,6-dimethylphenoxytrichlorotitanium.

The Ti trihalides are obtained according to known methods, for instance by reduction of TiCl$_4$ with Al or an organometallic Al compound or with hydrogen.

In the case of Ti trihalides, it may be convenient, for the purpose of improving the performance of the catalysts, to carry out an oxidization, even if partial, of the titanium, either during or after the preparation of component (c). To this purpose there may be used halogens, iodine halides.

Preferred catalysts are those in which: component (c) is obtained from $MgCl_2$, $TiCl_4$ a silicon compound selected from the groups of phenyl or ethyltriethoxysilane or diphenyldimethoxy or diethoxysilane, and Component (a) is an Al trialkyl, such as Al triethyl or Al triisobutyl.

One of the preferred methods of preparing component (c) consists in co-milling $MgCl_2$, $TiCl_4$ and the silicon compound and in treating the milled product with a halogenated hydrocarbon such as, for instance, 1,2-dichloroethane.

The catalysts according to this invention are used to polymerize the alpha-olefins according to known methods, that is, by carrying out the polymerization in a liquid phase, either in the presence or absence of an inert hydrocarbon solvent, or in gas phase or by combining, for instance, a liquid phase polymerization step with a gas phase step.

In general, the polymerization temperature is comprised between 40° and 160° C., but preferably between 60° and 90° C., operating either at atmospheric or at greater than atmospheric pressure.

As a molecular weight regulator hydrogen or other regulators of known type are used.

The catalysts are particularly suitable for polymerizing propylene, butene-1, styrene and 4-methylpentene. The catalysts may also be used according to known methods to polymerize mixtures of propylene and ethylene to form modified polypropylenes having improved shock-resistance at low temperatures (the so called block copolymers of propylene and ethylene) or to obtain random crystalline copolymers of propylene with minor proportions of ethylene.

The following examples are given for merely illustrative purposes and are not intended to be in any way limiting of the scope of the invention.

EXAMPLE 1

Into an inox steel autoclave of 2000 ml holding capacity, equipped with a magnetic stirrer and a thermometer, heat stabilized at 60° C. and kept under pressure by a nitrogen atmosphere, there were introduced 5 m moles of triethylaluminum, 1.5 m moles of phenyltriethoxysilane, the solid catalytic component obtained by reacting $TiCl_4$ with an adduct $MgCl_2.2.3C_2H_5OH$, operating under the same conditions described in Example 1 of Belgian patent No. 868,682 and 700 ml of degassed and anhydrous n-heptane, while propylene was also fed in. Example 1 of the Belgian patent No. 868,682 is the same as Example 1 in each of its U.S. counterparts, Nos. 4,294,721 and 4,439,540.

The catalytic component thus prepared showed an X-rays powder spectrum in which the most intense diffraction line appearing in the spectrum of $MgCl_2$ having 1 $m^2/g$ of surface area was decreased in relative intensity and broadened to form a halo.

Thereupon there was fed in 0.2 atm of hydrogen and then the whole was rapidly heated up to 70° C., while contemporaneously further propylene was fed in to reach a total pressure of 7 atm. This latter pressure was maintained constant throughout the polymerization by feeding in the monomer.

After 4 hours, the polymerization was interrupted, the polymer was isolated by filtering and then was dried. The quantity of polymer dissolved in the filtrate was thereupon isolated, weighed and summed to the polymer soluble in boiling n-heptane, for calculation of the isotacticity index.

The quantity of catalytic component used and the content of Ti in said component, the yield in polymer with respect to the introduced Ti, the isotacticity index (I.I.) and the inherent viscosity determined in tetralin at 35° C., are all reported in Table I.

EXAMPLE 2

Example 1 was repeated but using a solid catalytic component prepared as follows:

Anhydrous $MgCl_2$, phenyltriethoxysilane in molar ratio Mg/Si of 6, and $TiCl_4$ in molar ratio of 1:1 with respect to the phenyltriethoxysilane were co-milled in a vibrating mill of the type VIBRATOM manufactured by N. V. Tema's Gravenhage, Holland, having a total volume of one liter and containing 3 kg of stainless steel balls of 16 mm diameter.

Grinding was effected employing a filling coefficient equal to 100 g/l of total volume (vacuum), at an interior temperature of the mill of 25° C., and with grinding time of 72 hours.

Charging of the mill with the materials to be ground, and the grinding and discharging of the product of the co-grinding from the mill, occurred in a nitrogen atmosphere.

10 g of the co-ground product was contacted with 100 ml of 1,2-dichloroethane at 80° C. for 2 hours. After this period, 1,2-dichloroethane was removed by filtration at 80° C. and the residual solid product was repeatedly washed with n-heptane at room-temperature until the chlorine ions disappeared from the filtrate and was then kept in suspension in heptane.

The catalytic components thus prepared showed an X-rays powder spectrum in which the most intense diffraction line appearing in the spectrum of $MgCl_2$ having 1 $m^2/g$ of surface area was decreased in relative intensity and broadened to form a halo.

The characteristics of the solid catalytic component, and the results of the polymerization test are reported in Table I.

EXAMPLE 3

62 g of $MgCl_2$ and 12.5 g of $TiCl_4$ were introduced in the mill described in Example 2 and co-milled for 60 hours at room temperature. The content of titanium was 3.9% by weight.

10 g of the co-ground product were contacted with 100 ml of 1,2-dichloroethane at 80° C. for 2 hours. The solid was separated by filtering and then washed with heptane at said temperature until the disappearance of the chlorine ions from the filtrate. The X-rays powder spectrum was similar to that of the catalytic component of Example 1.

The solid catalytic component obtained was used in the polymerization of propylene under the same polymerization conditions described in Example 1. The results of the polymerization have been reported in Table I.

EXAMPLE 4

40 g of $MgCl_2$ was milled in the mill described in Example 2 for 200 hours at room temperature.

10 g of the ground product were treated with 150 ml of $TiCl_4$ for 2 hours at 135° C. After hot filtering, the treatment with $TiCl_4$ was repeated. After washing with heptane at 80° C. and drying, the dry solid was used under the same polymerization conditions as described in Example 1. The solid catalytic component showed an X-rays powder spectrum similar to that of the catalytic component of Example 1.

The results of the polymerization are shown in Table I.

COMPARATIVE EXAMPLE 1

200 mg of the solid catalytic component prepared according to Example 4 were used in the polymerization of propylene under the same conditions described in Example 1 but using ethyl p-toluate instead of PES. The results of the polymerization are reported in Table I.

COMPARATIVE EXAMPLE 2

Comparative Example 1 was repeated, but using the solid catalytic componenent prepared according to Example 3. The results of the polymerization test have been recorded in Table I.

TABLE I

| | Solid catalytic component | | Polymerization | | | |
|---|---|---|---|---|---|---|
| Example No. | Ti content of solid component % by weight | Catalyst mg | $Al(C_2H_5)_3$ donor (mols) | Yield g polymer g catalyst component | I.I. % | η inh dl/g |
| 1 | 2.5 | 46 | 3.33 | 7,000 | 80 | 1.3 |
| 2 | 3 | 40 | 10 | 6,300 | 95 | 1.0 |
| 3 | 1.3 | 55 | 5 | 2,700 | 86.6 | 1.1 |
| 4 | 0.5 | 200 | 3 | 1,000 | 83 | 1.0 |
| comp. 1 | 0.5 | 200 | 3.33 | 490 | 78 | 1.1 |
| comp. 2 | 1.3 | 73 | 3.33 | 650 | 77 | 1.4 |

What is claimed is:

1. Catalysts for the polymerization of alpha olefins consisting of the product of reaction of the following components:
   (a) An Al trialkyl or an Al alkyl compound containing 2 or more Al atoms linked to each other through an oxygen or nitrogen atom or through $SO_4$ or $SO_3$ groups;
   (b) a silicon compound containing one or more Si—OR, Si—OCOR or Si—$NR_2$ bonds, R being a hydrocarbyl radical, and selected from the group of compounds having the formula $R_mSiY_nX_p$ wherein:

R is an alkyl, alkenyl, aryl, arylalkyl or cycloalkyl radical with from 1 to 20 carbon atoms;

Y is an —OR', —OCOR', —$NR_2$' group wherein R', either equal to or different from R, has the same meaning as R;

X is either a halogen or a hydrogen atom or an —OCOR" or $NR"_2$ group wherein R", either equal to or different from R', has the same meaning as R';

m, n and p are numbers, respectively, between 1 and 3 for m, between 1 and 3 for n, and 0 or 1 for p; and m+n+p is equal to 4; and (c) a solid component consisting of an anhydrous Mg dihalide in active form as the support and, supported on said Mg dihalide, a Ti-trihalide or a Ti-tetrahalide and a silicon compound containing at least one Si—OR, Si—OCOR or $SiNR_2$ bonds, R being a hydrocarbyl radical and selected from the group consisting of phenyltrimethoxysilane, monochlorophenyldiethoxysilane, ethyltriisopropoxysilane, acetoxytriethoxysilane, butyltriethoxysilane, triphenylmonoethoxysilane, phenyltriethoxysilane and phenyldiethoxydiethylaminosilane in an amount such that the molar ratio between the supported silicon compound and the supported Ti-halide is from 0.1 to 5.

2. Process for the polymerization of alpha-olefins $CH_2$=CHR, in which R is an alkyl radical with 1 to 4 carbon atoms or an aryl radical, and mixtures of said olefins with ethylene, characterized in that the polymerization process is carried out in liquid phase in the presence or absence of an inert hydrocarbon solvent or in gas phase, in presence of a catalyst as defined in claim 1.

3. A catalyst as defined in claim 1, in which the Mg dihalide is Mg dichloride and the Ti tetrahalide in $TiCl_4$.

4. A catalyst as defined in claim 1, in which the Mg dihalide is Mg dibromide and the Ti tetrahalide is $TiCl_4$.

* * * * *